(12) United States Patent
Saitou

(10) Patent No.: US 6,450,911 B2
(45) Date of Patent: Sep. 17, 2002

(54) SILENT CHAIN

(75) Inventor: Toyonaga Saitou, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/749,096

(22) Filed: Dec. 27, 2000

(30) Foreign Application Priority Data

Dec. 27, 1999 (JP) .......................................... 11-370456

(51) Int. Cl.[7] .............................................. F16G 13/04
(52) U.S. Cl. ...................................... 474/213; 474/217
(58) Field of Search ................................ 474/213, 212, 474/157, 215, 214–217, 228, 229, 201

(56) References Cited

U.S. PATENT DOCUMENTS

| | | | | |
|---|---|---|---|---|
| 690,317 A | * | 12/1901 | Renold | 474/213 |
| 958,676 A | * | 5/1910 | Dodge | 474/213 |
| 958,677 A | * | 5/1910 | Dodge | 474/213 |
| 999,156 A | * | 7/1911 | Dodge | 474/213 |
| 1,586,857 A | * | 6/1926 | Stiansen | 474/213 |
| 1,598,906 A | * | 9/1926 | Dull | 474/214 |
| 2,246,810 A | * | 6/1941 | Nicolai | 474/224 |
| 4,058,021 A | * | 11/1977 | Wood | 474/157 |
| 5,941,113 A | * | 8/1999 | Kanemitsu et al. | 72/110 |

FOREIGN PATENT DOCUMENTS

JP  11-182635 A  7/1999

* cited by examiner

Primary Examiner—David A. Bucci
Assistant Examiner—Marcus Charles
(74) Attorney, Agent, or Firm—Howson & Howson

(57) ABSTRACT

A silent chain includes a number of interleaved rows of link plates articulately connected together by joint pins. Each of the link plates has a pair of teeth and a pair of pin holes. The link plate further has a tubular portion protruding continuously from one surface of the link plate and defining a peripheral surface of each of the pin holes. The tubular portion has a height substantially equal to the thickness of the link plate. The tubular portion increases the contact area between the plate and the joint pin and thus suppresses wear on the joint pin. Further, by the tubular portion, the plate can retain sufficient rigidity and strength without narrowing the web width between each pin hole and the outside flank or the inside flank of the corresponding tooth. The silent chain as a whole is relatively light in weight.

6 Claims, 6 Drawing Sheets

SILENT CHAIN

BACKGROUND OF THE INVENTION

This invention relates to a silent chain including a number of link plates articulately connected together by joint pins and each having a pair of teeth for meshing engagement with sprocket teeth and a pair of pin holes in which the joint pins are inserted.

In general, a silent chain includes articular link rows and guide link rows alternately arranged in the longitudinal direction of the chain and articulately connected by joint pins, such as round pins or rocker joint pins, in such a manner that link plates in each articular link row and link plates in the adjacent guide link row are interleaved in single-to-single, double-to-double, or single-to-double ply bases.

As shown in FIGS. 4 and 5, a conventional silent chain 20 generally comprises link plates 21 and 22 and guide plates 23 (see, Japanese Patent Laid-open Publication No. HEI-11-182635). The plates 21 form articulate link rows KL and, as shown in FIG. 6, the articulate link plate 21 has a hollow cylindrical bushing 26 formed separately from the plate 21 and fitted in each of a pair of engagement holes 25 formed in the plate 21. A joint pin 28 (FIGS. 4 and 5) is inserted into the bushing 26 so that the articulate link plate 21 is rotatable about the axis of the joint pin 28. The plates 22 and the guide plates 23 together form guide link rows GL. The guide link plate 22 has a pair of pin holes (not shown) into which the joint pin 28 is inserted. The guide link plate 22 may be or may not be rotatable about the axis of the joint pin 28. In addition, the guide link plate 22 may or may not have a pair of teeth for meshing engagement with the teeth of a sprocket.

Since the plate 21 is equipped with a bushing 26 fitted in the engagement hole 25, the contact area for sliding engagement between the inside surface of the pin hole 24 and the outside surface of the joint pin 28 is relatively large and hence can suppress wear on the joint pin 28. However, as compared to a bushingless plate 31 such as shown in FIG. 7, a web width W1' between the outside flank 27A of each tooth 27 and the peripheral edge 25' of the adjacent engagement hole 25 and a web width W2' between the inside flank 27B of the same tooth 27 and the peripheral edge 25' of the adjacent engagement hole 25 are made relatively small provided that the diameter of the pin hole 24 is the same as that of pin holes 32. There arises a problem that the plate 21 cannot maintain the necessary rigidity and strength. Thus, when subjected to a load during meshing engagement between the teeth 27 and the sprocket teeth, the plate 21 is liable to yield or deform due to insufficient rigidity and strength, thus making the meshing engagement unstable.

Most silent chains are formed solely by bushingless plates 31, namely, plates not quipped with a bushing. As shown in FIG. 7, the bushingless plate 31 can provide a relatively large web width W1, W2 between the peripheral edge 32' of each pin hole 32 and the outer or inner flank 33A or 33B of the adjacent tooth 33. Accordingly, even if the thickness of the plate 21 is reduced, the plate 21 is still able to maintain the necessary rigidity and strength. However, since the contact area for sliding movement between the inside surface of the pin hole 32 and the outside surface of the joint pin 28 decreases with the reduction in thickness of the plate 21, wear elongation of the silent chain is caused due to accelerated wear on the joint pin 28. To deal with this problem, the thickness t' of the plate 31 is increased to enlarge the contact area between the pin hole 32 and the joint pin 28, as shown in FIG. 8. However, the plate 31 becomes heavy and the overall weight of the silent chain is increased.

SUMMARY OF THE INVENTION

It is accordingly an object of the present invention to provide a silent chain which is capable of providing a relatively large contact area between pin holes in the link plates and joint pins without narrowing the web width between each pin hole and the outside or inside flank of the adjacent tooth of the link plate, thereby to suppress wear on the joint pins, prevent reduction in strength of the link plate, and limit the increase in the overall weight of the silent chain.

To achieve the foregoing object, a silent chain according to the present invention comprises a number of interleaved rows of link plates articulately connected together by joint pins. Each of the link plates has a pair of teeth and a pair of pin holes. The link plate has a tubular portion protruding continuously from one surface of the link plate and defining a peripheral surface of each of the pin holes. The tubular portion has a height substantially equal to the thickness of the link plate.

In each row of link plates, two link plates may arranged side by side with the respective tubular portions oriented in the same direction.

Alternatively, in each row of link plates, two link plates may be arranged side by side with the respective tubular portions oriented in the opposite directions. The tubular portions of one of the link plates and the tubular portions of the other link plate may be directed toward each other or directed away from each other.

The tubular projection is preferably formed by burring.

By virtue of the tubular portion, the link plate can retain a relatively large contact area between itself and joint pins and hence is able to suppress wear on the joint pins. In addition, the web width between each pin hole and the outside flank or the inside flank of the corresponding tooth is enlarged with the result that the link plate is highly resistant to deformation or yielding when it comes into meshing engagement with the sprocket teeth.

The above and other objects, features and advantages of the present invention will become manifest to those versed in the art upon making reference to the following description and accompanying sheets of drawings, in which certain preferred structural embodiments incorporating the principle of the invention are shown by way of illustrative example.

DETAILED DESCRIPTION OF THE PREFERRED EMBODIMENTS

The following description is merely exemplary in nature and is in no way intended to limit the invention or its application or use.

Figure 1:
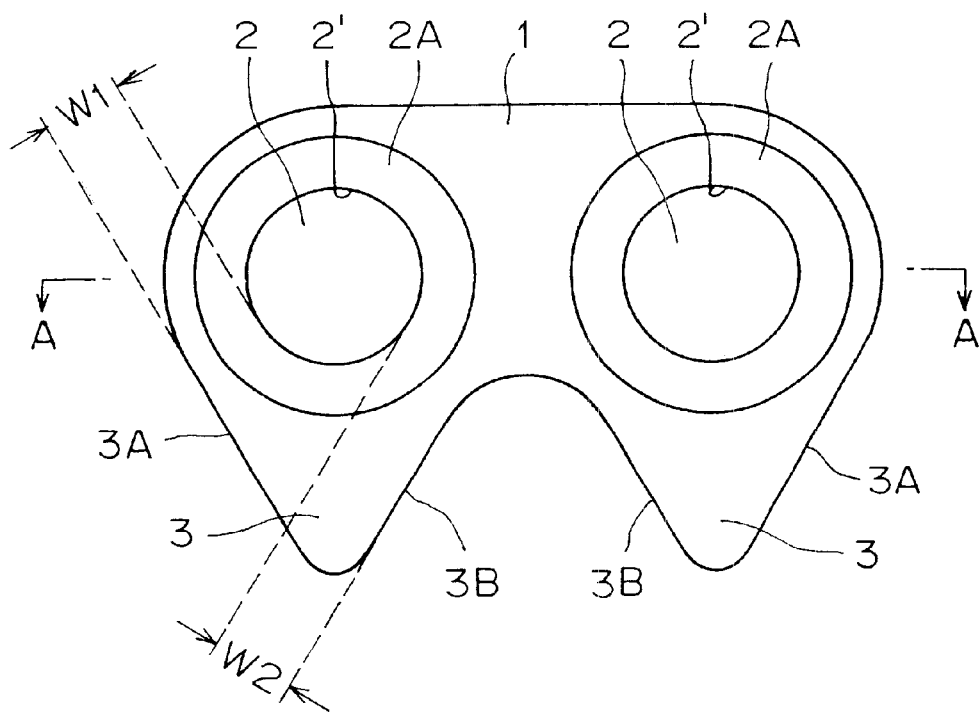
FIG. 1 is a plan view of a link plate of a silent chain according to an embodiment of the present invention.
Figure 4:
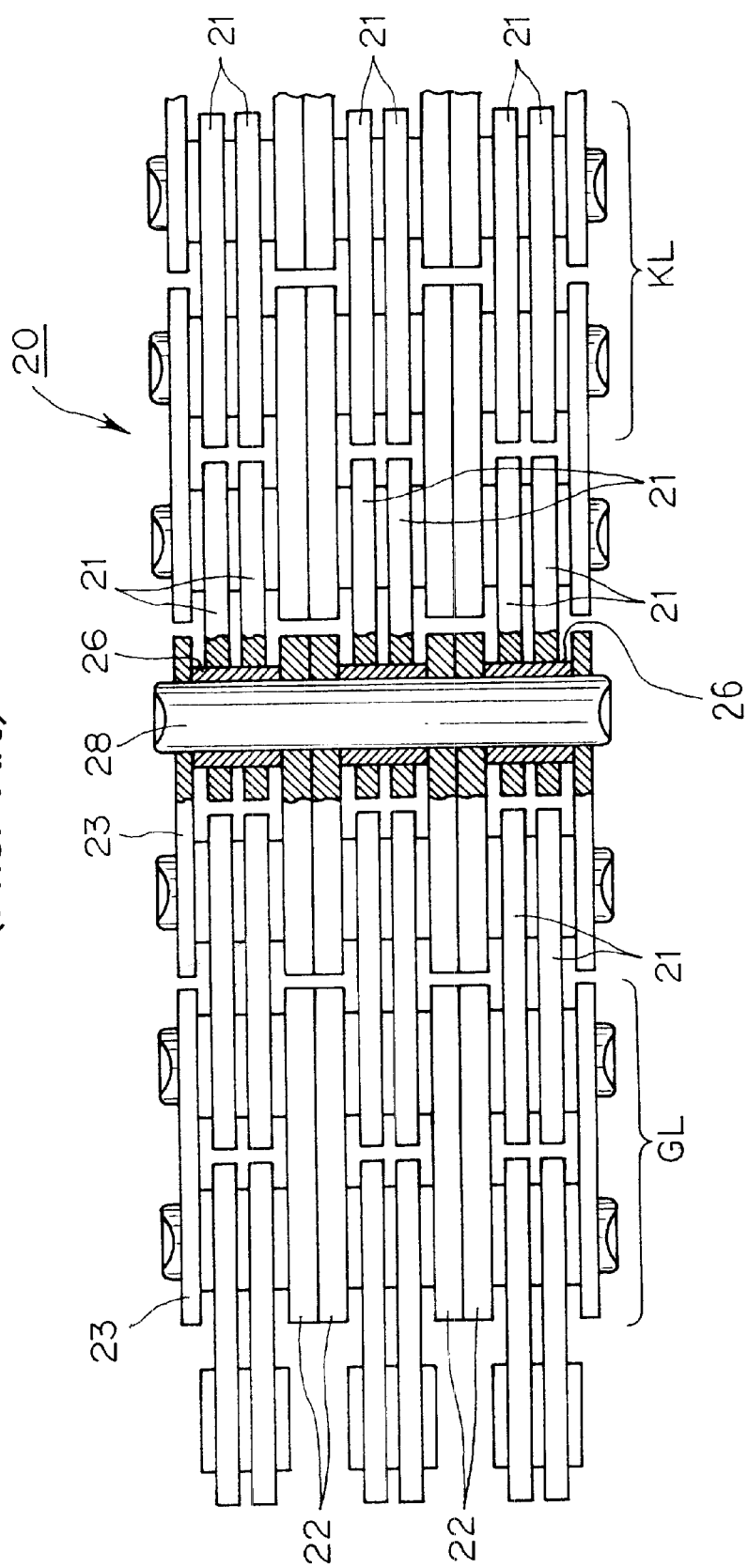
FIG. 4 is a plan view, with parts in cross section, of a conventional silent chain.
Figure 5:
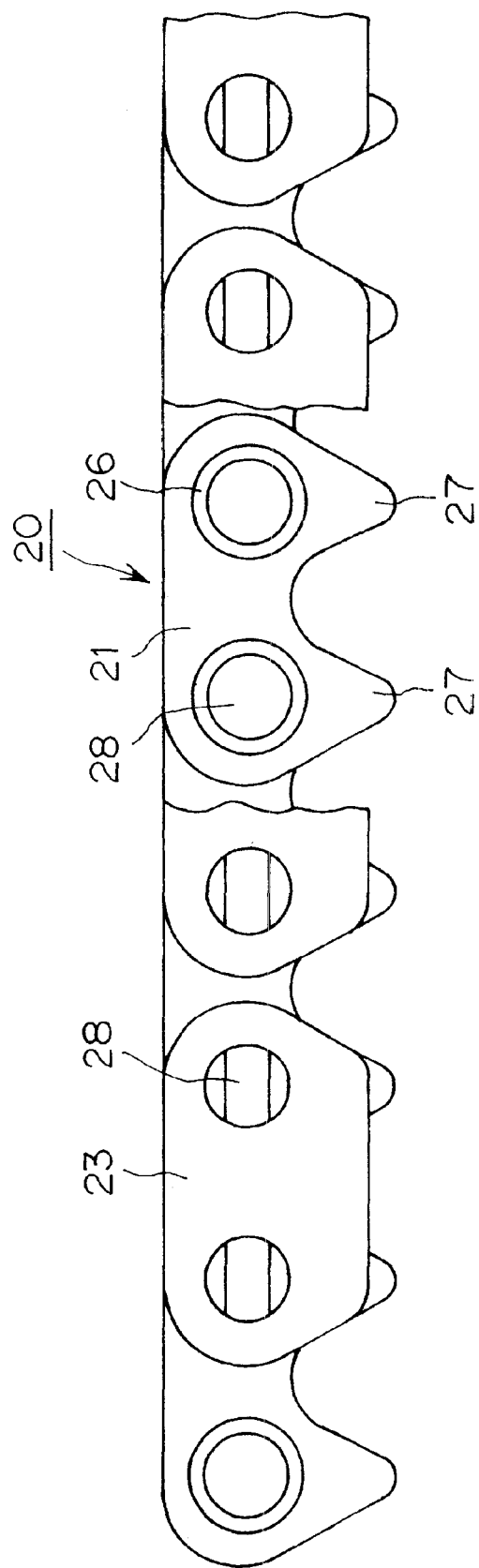
FIG. 5 is a front elevational view, with parts cut away for clarity, of the conventional silent chain.

FIG. 1 shows a link plate 1 according to an embodiment of the present invention. The link plate 1 is used in articular link rows and guide link rows of a silent chain in the same manner as shown in FIGS. 4 and 5. The link plate 1 has a pair of pin holes 2, 2 and a pair of teeth 3, 3. The teeth 3 each have an outside flank 3A and an inside flank 3B. The outside flank 3A or the inside flank 3B forms an engagement surface when the corresponding tooth 3 comes in meshing engagement with teeth on a sprocket (not shown).

Figure 2:
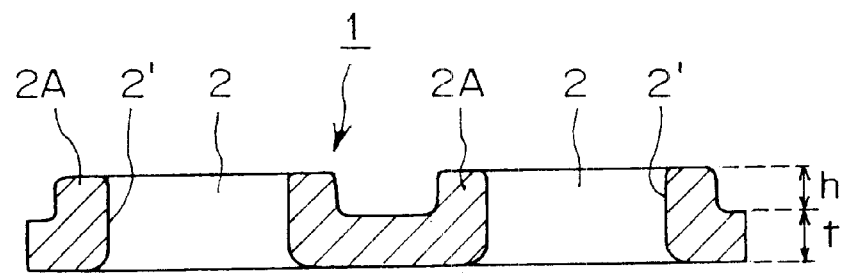
FIG. 2 is a cross-sectional view taken along line A—A of FIG. 1.

As shown in FIG. 2, the pin holes 2 formed in the link plate 1 each have a peripheral surface 2' formed or defined by a tubular portion 2A protruding continuously from one surface of the link plate 1. The tubular portion 2A is formed as an integral part of the link plate 1. The height h of the tubular portion 2A is determined optionally. It is preferable, however, that the height h of the tubular portion 2A is substantially equal to the thickness t of the link plate 1.

The tubular portion 2A is formed by burring a drilled portion of the link plate 1. In the illustrated embodiment, before the burring process is carried out, the link plate 1 is drilled to form a pair of blank holes (not shown) at a position corresponding to the position of pin holes 2 to be produced. The drilled blank holes are smaller in diameter than the pin holes 2. Then, the link plate 1 is supported on a die such that the drilled blank holes are in register with circular cavities formed in the die, the cavities having an inside diameter substantially equal to the outside diameter of a tubular portion 2A to be formed. Subsequently, punches having an outside diameter substantially equal to the inside diameter of the pin hole 2 are forced into the drilled blank holes whereby the drilled blank holes are enlarged and, at the same time, a portion of the plate extending around each drilled blank hole is shaped into a circular tube. By using the burring process, the tubular portion 2A defining a peripheral surface of the pin hole 2 can easily be produced.

Figure 6:
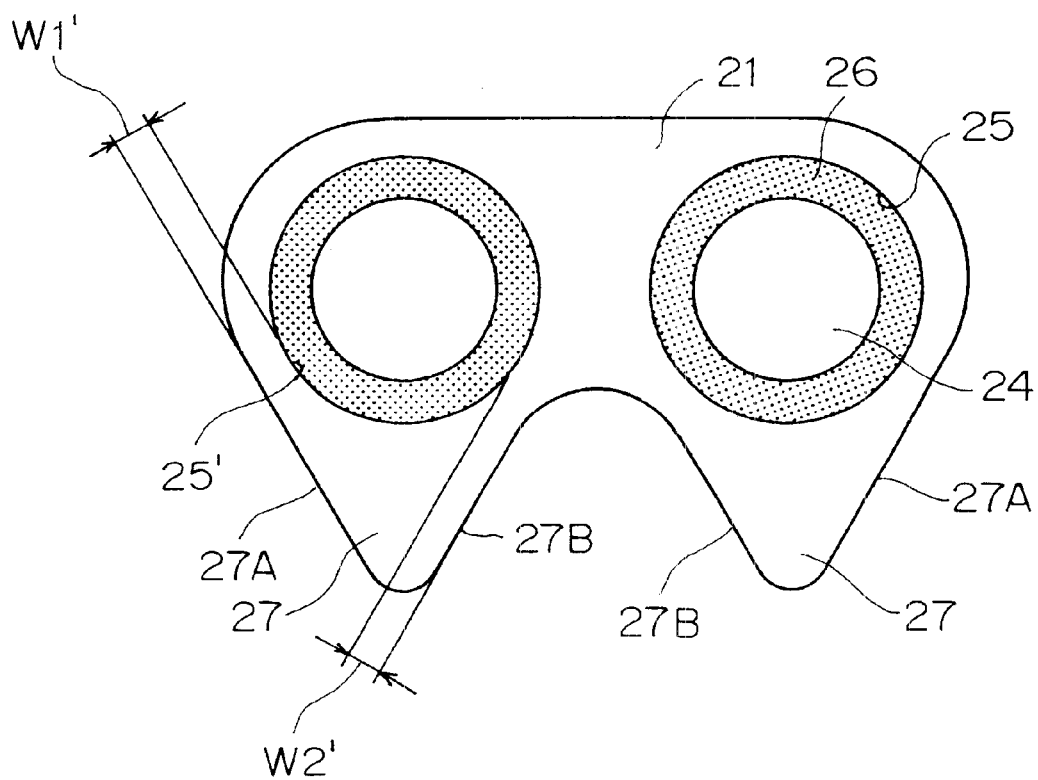
FIG. 6 is a plan view of a conventional link plate.
Figure 7:
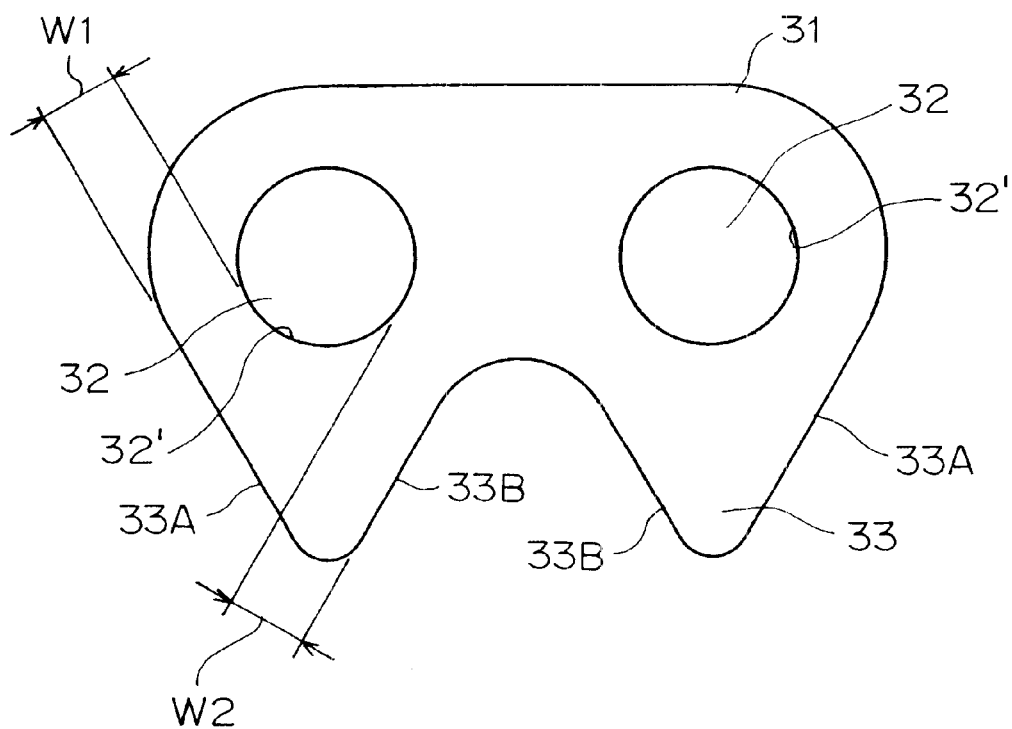
FIG. 7 is a plan view of a different conventional link plate.
Figure 8:
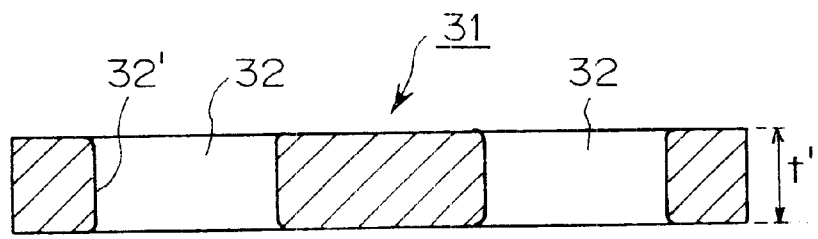
FIG. 8 is a cross-sectional view of the conventional link plate shown in FIG. 7.

In the link plate 1 thus formed, as shown in FIG. 1, a web width W1 between the peripheral surface 2' of each pin hole 2 and the outside flank 3A of the adjacent tooth 3 and a web width W2 between the peripheral surface 2' of the same pin hole 2 and the inside flank 3B of the adjacent tooth 3 are equal to the corresponding web widths W1 and W2, respectively, of the conventional bushingless link plate 31 shown in FIG. 7. This means that the web widths W1 and W2 of the link plate 1 are greater than the corresponding web widths W1' and W2', respectively, of the conventional bushed link plate 21 shown in FIG. 6. The link plate 1 can, therefore, maintain the necessary rigidity and strength even if the thickness is reduced. Further, by virtue of the integral tubular portion 2A, the link plate 1 can provide a relatively large contact for sliding movement between the pin hole 2 and a joint pin (not shown but identical to the one 28 shown in FIG. 4). This relatively large contact area is comparable to the contact area provided by the link plate 21 shown in FIG. 6, which has a bushing. With this large contact area, wear on the joint pin can be suppressed.

To form a silent chain, a large number of such link plates 1 are articulately connected together by joint pins such as round pins or rocker joint pins (see the joint pins 28 shown in FIG. 4) in such a manner that the link plates 1 are interleaved on a single-to-single ply basis, a double-to-double ply basis, or a single-to-double ply basis. In this case, the silent chain is formed solely by the link plates 1.

As an alternative, the link plates 1 may be assembled in double ply in the same manner as the articular link plates 21 of the conventional silent chain 20 shown in FIG. 4. In this instance, the link plates 22 (FIG. 4) forming the guide link rows GL may be either used in combination with the link plates 1 or replaced by the link plates 1.

Figure 3A:
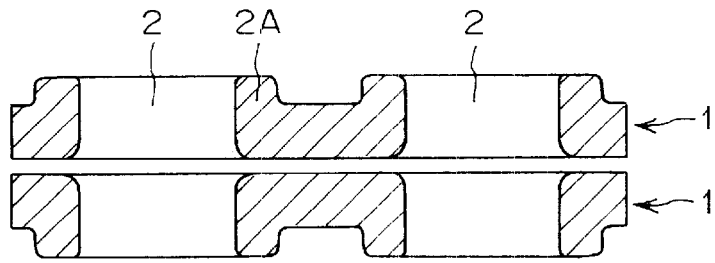
FIGS. 3A–3D are cross-sectional views illustrative of variations in arrangement of the link plate.
Figure 3B:
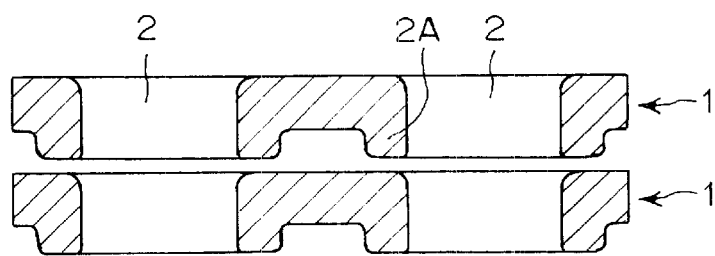
Figure 3C:
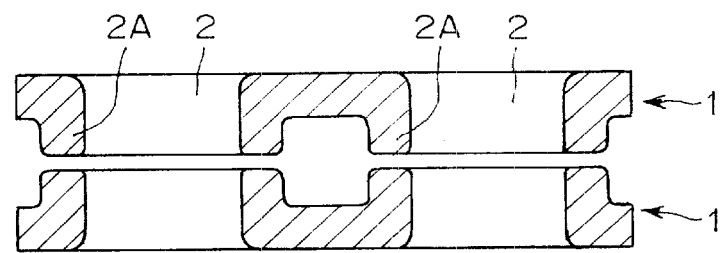
Figure 3D:
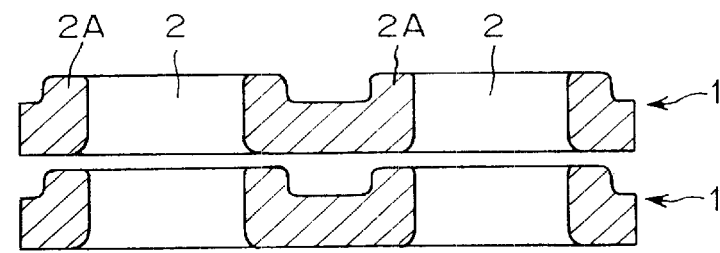

FIGS. 3A–3D show various arrangements of the link plate 1 available in assembling a silent chain. In FIG. 3A, two link plates 1 are arranged side by side in each row of link plates with the respective tubular portions 2A extending in opposite directions. In this arrangement, the tubular portions 2A of one link plate 1 and the tubular portions 2A of the other link plate 1 are directed away from each other. In FIG. 3B, two link plates 1 are arranged side by side in each row of link plates with the respective tubular portions 2A extending in the same direction. The arrangement shown in FIG. 3C is similar to the arrangement shown in FIG. 3A but differs therefrom in that the tubular portions 2A of one link plates 1 and the tubular portions of the other link plate 1 are directed toward each other. The arrangement shown in FIG. 3D is substantially the same as the arrangement of FIG. 3B with the exception that the tubular portions 2A are oriented in opposite relation to the tubular portions 2A of the plates 1 shown in FIG. 3B. In making a silent chain, the link plates 1 may be arranged in single play or in random orientation.

By virtue of the link plate 1 having an tubular portion 2A around each pin hole 2, the silent chain formed by such link plates 1 provides a relatively large contact area for sliding movement between the pin holes 2 ane joint pins and thus reduces wear on the joint pins. Further, the link plate 1 can maintain sufficient rigidity and strength which are comparable to those of the conventional bushingless link plate without causing reduction in the web width W1 or W2 between each pin hole 2 and the outside or inside flanks 3A, 3B of the corresponding tooth. When meshing with the sprocket teeth, the link plate 1 does not cause deformation and insures stable meshing operation. In addition, the thickness of the plate 1 can be reduced with the result that the silent chain as a whole is relatively light in weight. In a roller chain which falls in a different category from the silent chain, there is a plate having a tubular portion formed by burring. The tubular portion of the roller chain has a role to support or bear a roller adapted to mesh with the teeth on a sprocket and to retain a contact area between itself and a joint pin. In the silent chain of the present invention, however, the burring process achieved in forming a tubular portion on the plate is used for the purpose of preventing reduction in strength of a toothed portion of the link plate adapted to mesh with the sprocket teeth, providing a large contact area between the plate and the joint pins, and decreasing the weight of the link plate.

As described above, the link plate forming the silent chain of the present invention has an integral tubular portion protruding continuously from one surface of the link plate and defining a peripheral surface of each of a pair of pin holes. The tubular portion preferably has a height substantially equal to the thickness of the plate. By the tubular portion, the plate has an enlarged contact area for sliding engagement between itself and joint pins inserted into the pin holes and can suppress wear on the joint pins. Further, the link plate having such tubular portions retains sufficient rigidity and strength without reducing the web width between each pin hole and the outside flank or the inside flank of the corresponding tooth. Thus, the plate does not undergo deformation or yielding when it comes into meshing engagement with the sprocket teeth. The silent chain constituted by the link plates is relatively light in weight.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain comprising:

a plurality of rows of link plates, the rows being interleaved and articulably connected together by joint pins;

each of the link plates of each of the interleaved rows having a pair of teeth with inner and outer flanks, two opposite side surfaces, a pair of pin holes, and two tubular portions protruding from one of said side surfaces, each said tubular portion being unitary with the link plate, having a length substantially equal to the thickness of the link plate, and terminating in an outer end spaced from said one of said side surfaces by a distance equal to said length;

each pin hole of said pair of pin holes having a cylindrical inner surface of uniform diameter, the cylindrical inner surface extending completely around an axis and extending continuously, in an axial direction, from the other of said side surfaces, and through one of said tubular portions, to said outer end of said one of said tubular portions;

whereby the cylindrical inner surface of each pin hole contacts a joint pin therein over a cylindrical surface area of the joint pin having a length equal to the thickness of a link plate plus the length of a tubular portion, for minimization of wear elongation of the chain, and the web widths between the pin holes and the adjacent inner and outer tooth flanks are sufficiently large to maintain good rigidity and strength in the link plates.

2. A silent chain according to claim 1, wherein in each row of link plates, at least two of said link plates are arranged side by side with their respective tubular portions oriented in the same direction.

3. A silent chain according to claim 1, wherein said tubular portions are formed by burring.

4. A silent chain according to claim 1, wherein in each row of link plates, at least two of said link plates are arranged side by side with their respective tubular portions oriented in the opposite directions.

5. A silent chain according to claim 4, wherein the tubular portions of one of the at least two of said link plates and the tubular portions of the other of the at least two of said link plates are directed toward each other.

6. A silent chain according to claim 4, wherein the tubular portions of one of the at least two of said link plates and the tubular portions of the other of the at least two of said link plates are directed away from each other.

* * * * *